United States Patent [19]

Huperz et al.

[11] 4,256,139
[45] Mar. 17, 1981

[54] VALVE ASSEMBLY FOR HIGH-PRESSURE PISTON PUMP

[75] Inventors: Adalbert Huperz, Hockenheim; Wolfgang Maasberg, Hünxe-Krudenburg, both of Fed. Rep. of Germany

[73] Assignee: Woma-Apparatebau, Duisburg, Fed. Rep. of Germany

[21] Appl. No.: 948,542

[22] Filed: Oct. 4, 1978

[30] Foreign Application Priority Data

Oct. 8, 1977 [DE] Fed. Rep. of Germany ....... 2745470

[51] Int. Cl.³ ............................................. F16K 15/02
[52] U.S. Cl. ............................ 137/512.3; 137/543.17; 137/514
[58] Field of Search ....................... 137/516.17, 516.19, 137/516.21, 516.23, 543.17, 514, 512.3, 543.15; 417/568

[56] References Cited

U.S. PATENT DOCUMENTS

| | | | |
|---|---|---|---|
| 1,677,056 | 7/1928 | Small | 137/543.17 |
| 1,834,590 | 12/1931 | Holdsworth | 137/516.23 |
| 2,090,486 | 8/1937 | Richardson | 137/516.21 |
| 3,456,684 | 7/1969 | Sochting | 137/543.17 |
| 3,526,246 | 9/1970 | Leitgeb | 137/512.3 |
| 3,702,624 | 11/1972 | Fries | 137/516.23 X |
| 3,792,939 | 2/1974 | Zalis | 417/568 X |

FOREIGN PATENT DOCUMENTS 841303   2/1939   France ............................... 137/543.17

*Primary Examiner*—William R. Cline
*Attorney, Agent, or Firm*—Karl F. Ross

[57] ABSTRACT

A valve assembly for a high-pressure pump has a housing forming a valve chamber connected to the pump chamber and having a generally annular intake port which opens at an internal surface of the housing. An abutment is provided in this housing spaced from the surface and an annular valve disk is displaceable a relatively short distance in the housing between a closed position engaged over the intake port and an open position spaced from the intake port and resting against the abutment and serves as the sole support for this disk. One or more valve bodies are similarly solely supported by a spring may be provided at the exhaust port for closing same during the intake stroke of the pump.

8 Claims, 1 Drawing Figure

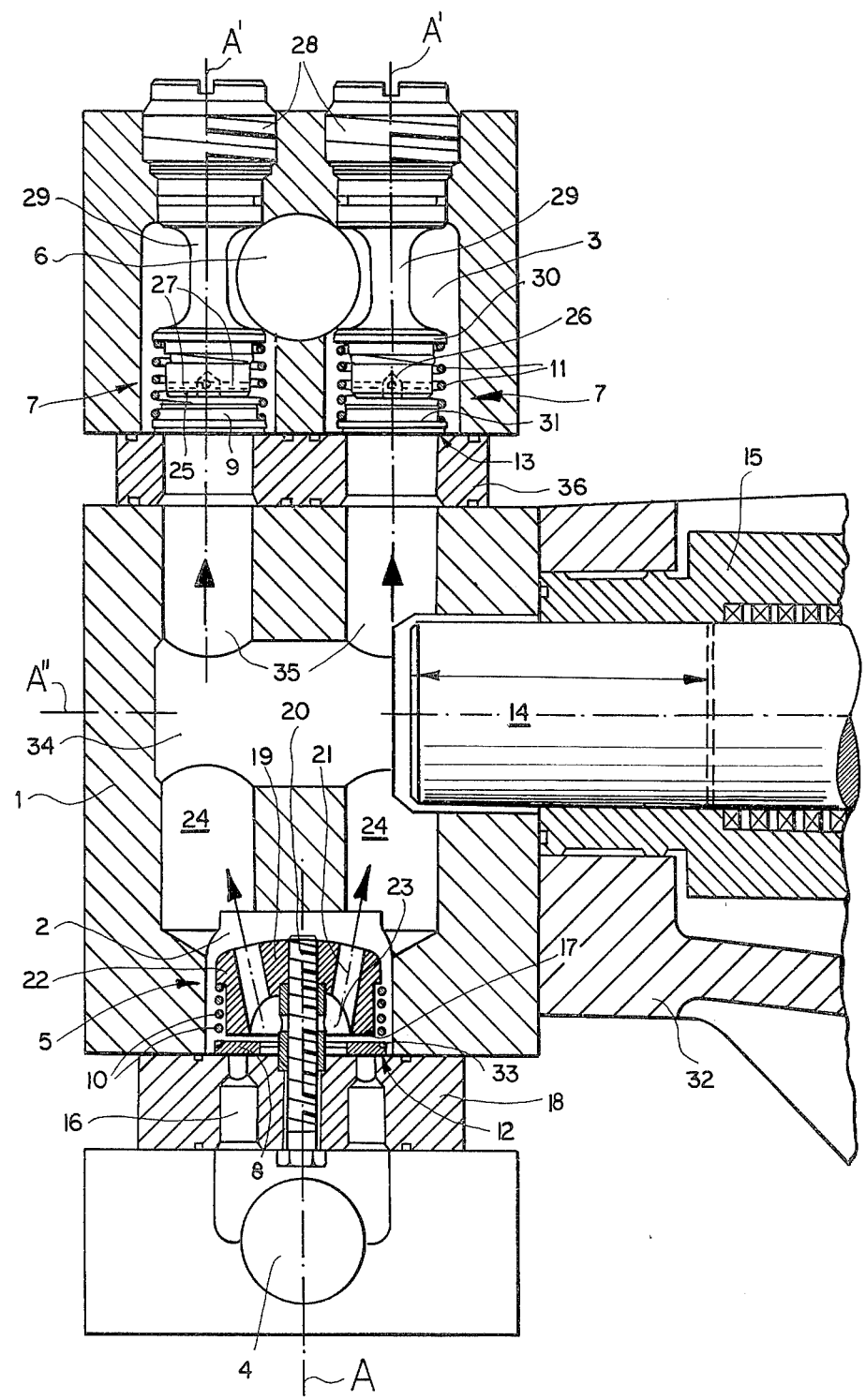

VALVE ASSEMBLY FOR HIGH-PRESSURE PISTON PUMP

FIELD OF THE INVENTION

The present invention relates to a valve assembly. More particularly this invention concerns such an assembly containing the valves at the intake and exhaust ports of a high-pressure piston pump.

BACKGROUND OF THE INVENTION

A high-pressure pump such as described in our copending and commonly assigned application Ser. No. 954,549 has a pumping chamber whose volume is periodically increased and decreased, normally by reciprocation of a piston. A so-called valve head or unit is attached to the housing of this pump and itself has a valve chamber communicating with the pumping chamber of the pump. This valve unit or assembly is formed with an intake port and at least one exhaust port, and is provided with check valves at each of these ports for one-way flow through the valve chamber.

In a common valve assembly used in a high-pressure piston pump the intake and exhaust ports are axially aligned with each other and open axially oppositely into the valve chamber. Each of these ports is associated with a respective valve body urged into sealing engagement over the respective port by a respective spring. Each of these valve bodies is a simple imperforate disk and is guided in a respective cage that also houses the respective spring. These two guides can be constituted as tubes which are received in the pumping chamber and which bear axially oppositely against each other. These guide tubes are in turn formed with relatively large openings serving for traversal by the pumped fluid, and also with several smaller holes whose function mainly is to allow fluid to enter the tubes and act on the respective valve bodies.

The above-described system is relatively complex, and is highly prone to wear. Furthermore the operation of such valves is typically relatively sluggish, so that during the response time backflow is possible, with corresponding loss of pressure and pump efficiency.

OBJECTS OF THE INVENTION

It is therefore an object of the instant invention to provide an approved valve assembly for a high-pressure pump.

Another object is the provision of such an assembly which has an extremely rapid response time, yet which is relatively simple in construction and little prone to wear.

Yet another object is to provide such an assembly usable in the valve head of a high-pressure piston pump.

SUMMARY OF THE INVENTION

These objects are attained according to the instant invention in a valve assembly for use in the valve head of a high-pressure pump which has a housing forming a valve chamber. This housing is formed with a generally annular intake port opening at an internal surface of the chamber and has an abutment forming an annular abutment surface turned toward and spaced from the intake port. An annular washer-type valve disk is displaceable in this housing between a closed position engaged sealingly with the internal surface of the valve chamber over the annular intake port and an open position spaced from the port and resting against the annular abutment surface. A spring has one end fixed in the housing and another end carrying and acting substantially as the sole support for this valve disk. This spring urges the disk into the closed position.

Such an arrangement is extremely simple and fast-acting. As no guide is provided around the valve disk there is very little to impede its motion as it opens and similarly the possibility of wear of this disk and of the guide is almost completely eliminated. When open the valve disk lies flatly against the abutment surface so valve flutter is completely eliminated. Furthermore the use of an annular valve disk and an annular intake port, which may be formed by an annular array of openings, ensures that once the valve is open a relatively large flow cross section is even present with a very small valve stroke. As the valve disk itself can be made relatively light, and its spring can be correspondingly lightly dimensioned, the inertia of this part of the valve will be very low and, therefore, the valve will open extremely rapidly with virtually no delay.

According to further features of this invention the abutment is constituted as a separate member mounted inside the valve chamber on a bolt or threaded pin that extends with play through the central hole of the annular valve disk. This abutment in turn is formed with a recess of circular or parabolic section open toward the intake port and at which open throughgoing passages. Thus when the valve disk lies against the annular abutment surface of this abutment flow is possible both around the valve disk and through its central hole.

According to further features of this invention the pump is divided at least at its exhaust side to a pair of passages each of which is provided with a respective exhaust valve constructed in a manner similar to that of the intake valve described above. More particularly each such exhaust valve body is carried only by a spring and engageable over a nonannular exhaust port to close the valve and lies against a flat abutment surface when the valve is open. The abutment in this case has a flat continuous abutment surface at which opens a throughgoing passage of relatively small flow cross section. Thus as the flat back surface of the respective valve body comes to rest against this flat surface a fluid cushion will be created that will dissipate through the restriction-forming passage, so that the valve body will come gently to rest against the abutment. When the valve closes, flow through this passage will allow the valve body to pull easily away from the abutment without the normal suction inherently created between two flat surfaces. Each of the abutments is formed as the end of a bolt screwed into the housing, so that it is possible to withdraw the bolt carrying the spring and carrying the valve body in a simple operation to renew or replace the valve. Such an arrangement also readily allows the pump to be set up with a single intake and a pair of exhausts.

BRIEF DESCRIPTION OF THE DRAWING

The sole FIGURE of the drawing is an axial section through a pump equipped with a valve assembly according to this invention.

SPECIFIC DESCRIPTION

As shown in FIG. 1 a valve housing 1 is bolted to a housing 32 of a pump having a cylinder 15 in which is reciprocal a piston 14 along an axis $A''$. The housing 1 is formed with an intake valve chamber 2 and an exhaust valve chamber 3 respectively connected to intake and exhaust ports 4 and 6 respectively having intake and exhaust valves 5 and 7 having respective intake and exhaust valve bodies 8 and 9.

More particularly the valve body 8 of the intake valve 5 is constituted as a thin washer of rectangular section. It can overlie as shown in the drawing a seat 12 formed in an insert body 18 having an annular array of stepped bores 16 whose inner ends constitute the annular intake passage that can be blocked by this member 8.

An abutment body 19 is centered on an axis A on which the intake port is centered and is carried on a mounting bolt 20 screwed through the insert 18 so that it is spaced from the seat 12 and has an annular surface 17 directly confronting and parallel to the seat 12. This body is formed at its center with a parabolic recess 23 open toward the insert 18 and with a plurality of generally axially throughgoing flow passages 21. The chamber 2 has a diameter somewhat greater than the body 19.

A spring 10 has an upper end bearing on a shoulder 22 of the body 19 and a lower end received in a step 33 formed in the outer periphery of the washer-type annular disk 8.

The chamber 2 opens into a pair of passages 24 extending through a chamber 34 of the housing 1 and then through two more passages 35 which extend through an insert 36 and open at a pair of valve seats 13 for the valves 7. Each of these valves 7 has a flat valve disk constituting the valve body 9 and formed with a shoulder 31 over which is fitted one end of a spring 11 whose other end is received against a shoulder 30 of a bolt 28 having a narrow waist portion 29. Each of these bolts 28 has an end surface 25 against which a flat back or upper surface of the respective valve body 9 can engage.

In order to prevent a buildup of fluid between these flat surfaces as the valve body 9 moves upwardly from the illustrated closed position the bolts 28 are each formed with a short blind bore 26 open axially relative to the respective axis A′ and with a plurality of small-diameter radial bores 27. Thus as each of the valve bodies 9 moves up the fluid trapped between it and the respective surface 25 will be able to pass out through the bores 26 and 27 so that the valve body 9 can come smoothly to rest against the respective surface 25. Similarly when being pushed back or away from this surface 25 by the respective spring 11 fluid can enter between the planar surfaces via the bores 26 and 27.

In operation as the pump piston 14 withdraws toward the left in the drawing the valves 7 will be held tightly shut by fluid pressure, but the low pressure created inside the valve housing 1 will lift the valve body 8 up off the surface 12. Fluid rushing through the bores 16 of decreasing diameter will then be able to flow around the body 19 and through the body 19 at the passages 21. This fluid will therefore fill the chamber until the piston 14 reaches its fully withdrawn position.

Advance of the piston 14 will allow the spring 10 to push the valve body 8 tightly down over the annular intake port formed by the stepped bores 16, and will correspondingly lift the bodies 9 off the seats 13. The fluid will then be able to pass out through the two passages 35 which may be connected to separate exhaust ports, or to a single exhaust port 6 as shown here. Due to the relatively small mass of the bodies 8 and 9 the respective valves will respond very rapidly and will therefore allow the pump to operate with maximum efficiency.

I claim:

1. A valve assembly for a high-pressure pump, said assembly comprising:
   a housing having a housing surface and a planar internal surface and formed with an exhaust port and with a generally annular intake port for said pump opening respectively at said housing surface and at said planar surface;
   a first abutment in said housing having a planar annular abutment surface turned toward, parallel to, and spaced from said planar internal surface at said intake port;
   an annular valve disk having a pair of opposite planar disk surface and displaceable in said housing between a closed position with one of said planar disk surfaces engaged sealingly with said internal surface over said annular intake port and an open position spaced from said intake port and with the other of said planar disk surfaces resting against said annular abutment surface;
   a first spring having one end fixed in said housing and another end carrying and acting substantially as the sole support for said disk, said spring urging said disk into said closed position;
   a valve body sealingly engageable with said housing surface over said exhaust port;
   a second abutment having a second abutment surface against which said valve body rests in an open position thereof and formed with at least one throughgoing passage opening at said second abutment surface; and
   a second spring carrying and acting substantially as the sole support for said body, said other spring urging said body toward said housing surface.

2. The assembly defined in claim 1 wherein said housing is formed with intake passages constituting said intake port and terminating at said internal surface, said intake passages being of decreasing cross-sectional area toward said internal surface.

3. The assembly defined in claim 2 wherein said housing has an insert formed with said intake passages and forming said internal surface.

4. The assembly defined in claim 1 wherein said first abutment is formed with throughgoing passages opening within the inner periphery of said annular abutment surface, whereby in an open position of said valve disk fluid can flow through the central hole of said disk and through said throughgoing passages of said first abutment.

5. The assembly defined in claim 4 wherein said housing includes a mounting pin seated in said housing, passing through the central hole of said valve disk with play, and carrying said first abutment.

6. The assembly defined in claim 4 wherein said abutment is formed with a shoulder against which said spring bears, and with a central recess open toward said internal surface, said throughgoing passages of said first abutment opening into said central recess thereof.

7. The assembly defined in claim 1 wherein said housing is formed with a valve chamber containing said abutment, and with a plurality of passages opening into said chamber opposite said port.

8. The assembly defined in claim 1 wherein said other abutment is formed as a bolt screwed into said housing.

* * * * *